*(12)* United States Patent
Bolles et al.

(10) Patent No.: US 9,752,933 B2
(45) Date of Patent: *Sep. 5, 2017

(54) OPTICAL EMISSION SYSTEM INCLUDING DICHROIC BEAM COMBINER

(71) Applicant: AGILENT TECHNOLOGIES, INC., Loveland, CO (US)

(72) Inventors: Michael Bolles, St Kilda (AU); Yin Sheng Sun, Glen Waverley (AU); Lindsay Buck, Narre Warren (AU); Glyn Russell, Brunswick West (AU)

(73) Assignee: Agilent Technologies, Inc., Santa Clara, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/614,381

(22) Filed: Feb. 4, 2015

(65) Prior Publication Data

US 2015/0138548 A1    May 21, 2015

Related U.S. Application Data

(63) Continuation of application No. 13/460,308, filed on Apr. 30, 2012, now Pat. No. 9,279,722.

(51) Int. Cl.
*G01J 3/30* (2006.01)
*G01J 3/10* (2006.01)
(Continued)

(52) U.S. Cl.
CPC ............... *G01J 3/10* (2013.01); *G01J 3/0205* (2013.01); *G01J 3/0208* (2013.01); *G01J 3/12* (2013.01);
(Continued)

(58) Field of Classification Search
CPC .. G01J 3/10; G01J 3/443; G01J 3/0291; G01J 3/0205; G01N 21/64; G01N 21/65; G01N 21/6428; G02B 27/141; G02B 27/1006
See application file for complete search history.

(56) References Cited

U.S. PATENT DOCUMENTS 3,704,061 A    11/1972  Travis
4,795,256 A    1/1989   Krause et al.
(Continued)

FOREIGN PATENT DOCUMENTS

CN    1389722 A    1/2003
CN    1788194 A    6/2006
(Continued)

OTHER PUBLICATIONS

Final Office Action dated Aug. 5, 2015 from U.S. Appl. No. 13/460,308.
(Continued)

*Primary Examiner* — Michael A Lyons

(57) ABSTRACT

An optical emission spectrometer system includes a light source and a dichroic beam combiner. The light source emits first light in a first direction and second light in a second direction different from the first direction. The dichroic beam combiner receives the first light via a first light path and the second light via a second light path, reflects a portion the first light into an entrance aperture of a light detection and measurement apparatus, and transmits a portion of the second light into the entrance aperture, enabling analysis and measurement of both first and second light characteristics simultaneously. The portion of the first light reflected into the entrance aperture predominately has wavelengths in a first range of wavelengths and the portion of the second light transmitted into the entrance aperture predominately has wavelengths in a second range of wavelengths, different from the first range of wavelengths.

20 Claims, 7 Drawing Sheets

(51) Int. Cl.
*G01J 3/443* (2006.01)
*G01J 3/02* (2006.01)
*G01J 3/12* (2006.01)

(52) U.S. Cl.
CPC ....... *G01J 3/443* (2013.01); *G01J 2003/1217* (2013.01)

(56) References Cited

U.S. PATENT DOCUMENTS

| | | | |
|---|---|---|---|
| 4,846,154 A | 7/1989 | MacAnally et al. |
| 5,124,552 A | 6/1992 | Anderson |
| 5,200,595 A | 4/1993 | Boulos et al. |
| 5,303,139 A | 4/1994 | Mark |
| 5,362,939 A | 11/1994 | Hanus et al. |
| 5,394,061 A | 2/1995 | Fujii |
| 5,455,422 A | 10/1995 | Anderson et al. |
| 5,459,572 A | 10/1995 | Rasanen et al. |
| 5,477,280 A | 12/1995 | Ko |
| 5,477,321 A | 12/1995 | Johnson |
| 5,483,337 A | 1/1996 | Barnard et al. |
| 5,560,844 A | 10/1996 | Boulos et al. |
| 5,642,190 A | 6/1997 | Krupa et al. |
| 5,681,418 A | 10/1997 | Ishimaru |
| 5,684,581 A | 11/1997 | French et al. |
| 5,726,415 A | 3/1998 | Luo et al. |
| 5,747,935 A | 5/1998 | Porter et al. |
| 5,792,272 A | 8/1998 | Van et al. |
| 5,827,370 A | 10/1998 | Gu |
| 5,828,450 A | 10/1998 | Dou et al. |
| 5,864,139 A | 1/1999 | Reffner et al. |
| 5,877,471 A | 3/1999 | Huhn et al. |
| 5,880,426 A | 3/1999 | Fukui et al. |
| 5,897,059 A | 4/1999 | Muller |
| 5,906,758 A | 5/1999 | Severance |
| 5,908,566 A | 6/1999 | Seltzer |
| 5,917,286 A | 6/1999 | Scholl et al. |
| 5,936,481 A | 8/1999 | Fujii |
| 5,944,899 A | 8/1999 | Guo et al. |
| 5,962,987 A | 10/1999 | Statnic |
| 5,965,039 A | 10/1999 | Kitahashi et al. |
| 6,020,794 A | 2/2000 | Wilbur |
| 6,046,546 A | 4/2000 | Porter et al. |
| 6,093,660 A | 7/2000 | Jang et al. |
| 6,130,831 A | 10/2000 | Matsunaga |
| 6,137,078 A | 10/2000 | Keller |
| 6,184,535 B1 | 2/2001 | Kashima et al. |
| 6,184,984 B1 | 2/2001 | Lee et al. |
| 6,217,175 B1 | 4/2001 | Wong et al. |
| 6,222,321 B1 | 4/2001 | Scholl et al. |
| 6,268,583 B1 | 7/2001 | Yamaguchi et al. |
| 6,288,780 B1 | 9/2001 | Fairley et al. |
| 6,385,977 B1 | 5/2002 | Johnson |
| 6,410,880 B1 | 6/2002 | Putvinski et al. |
| 6,424,416 B1 | 7/2002 | Gross et al. |
| 6,447,719 B1 | 9/2002 | Agamohamadi et al. |
| 6,469,919 B1 | 10/2002 | Bennett |
| 6,559,408 B2 | 5/2003 | Smith et al. |
| 6,611,330 B2 | 8/2003 | Lee et al. |
| 6,618,276 B2 | 9/2003 | Bennett |
| 6,621,674 B1 | 9/2003 | Zahringer et al. |
| 6,664,497 B2 | 12/2003 | Smith et al. |
| 6,687,000 B1 | 2/2004 | White |
| 6,690,509 B2 | 2/2004 | Vodyanoy et al. |
| 6,693,253 B2 | 2/2004 | Boulos et al. |
| 6,703,080 B2 | 3/2004 | Reyzelman et al. |
| 6,735,099 B2 | 5/2004 | Mark |
| 6,740,842 B2 | 5/2004 | Johnson et al. |
| 6,752,972 B1 | 6/2004 | Fraim et al. |
| 6,777,881 B2 | 8/2004 | Yuzurihara et al. |
| 6,791,274 B1 | 9/2004 | Hauer et al. |
| 6,815,633 B1 | 11/2004 | Chen et al. |
| 6,841,124 B2 | 1/2005 | Chien et al. |
| 6,852,277 B2 | 2/2005 | Platt, Jr. et al. |
| 6,855,906 B2 | 2/2005 | Brailove |
| 6,885,567 B2 | 4/2005 | Lincoln et al. |
| 6,887,339 B1 | 5/2005 | Goodman et al. |
| 6,919,526 B2 | 7/2005 | Kinerson et al. |
| 6,943,317 B1 | 9/2005 | Ilic et al. |
| 6,946,616 B2 | 9/2005 | Kinerson et al. |
| 6,946,617 B2 | 9/2005 | Brandt et al. |
| 6,967,305 B2 | 11/2005 | Sellers |
| 6,989,505 B2 | 1/2006 | MacKenzie et al. |
| 6,998,566 B2 | 2/2006 | Conway et al. |
| 7,005,600 B2 | 2/2006 | Conway et al. |
| 7,019,254 B2 | 3/2006 | MacKenzie et al. |
| 7,026,626 B2 | 4/2006 | Harrison |
| 7,067,818 B2 | 6/2006 | Harrison |
| 7,071,443 B2 | 7/2006 | Conway et al. |
| 7,078,650 B2 | 7/2006 | Gross et al. |
| 7,079,252 B1 | 7/2006 | Debreczeny et al. |
| 7,084,832 B2 | 8/2006 | Pribyl |
| 7,126,080 B1 | 10/2006 | Renault et al. |
| 7,126,131 B2 | 10/2006 | Harrison |
| 7,132,619 B2 | 11/2006 | Conway et al. |
| 7,132,996 B2 | 11/2006 | Evans et al. |
| 7,145,098 B2 | 12/2006 | MacKenzie et al. |
| 7,157,857 B2 | 1/2007 | Brouk et al. |
| 7,161,818 B2 | 1/2007 | Kirchmeier et al. |
| 7,167,249 B1 | 1/2007 | Otten, III |
| 7,180,758 B2 | 2/2007 | Lincoln et al. |
| 7,189,973 B2 | 3/2007 | Harrison |
| 7,271,394 B2 | 9/2007 | Harrison |
| 7,292,045 B2 | 11/2007 | Anwar et al. |
| 7,335,850 B2 | 2/2008 | Kuo et al. |
| 7,353,771 B2 | 4/2008 | Millner et al. |
| 7,394,551 B2 | 7/2008 | Harrison |
| 7,429,714 B2 | 9/2008 | DePetrillo et al. |
| 7,440,301 B2 | 10/2008 | Kirchmeier et al. |
| 7,446,876 B2 | 11/2008 | Harrison |
| 7,465,430 B2 | 12/2008 | Plischke et al. |
| 7,482,757 B2 | 1/2009 | Quon et al. |
| 7,514,936 B2 | 4/2009 | Anwar et al. |
| 7,541,558 B2 | 6/2009 | Smith et al. |
| 7,544,913 B2 | 6/2009 | Helenius et al. |
| 7,570,358 B2 | 8/2009 | Den Boef |
| 7,652,901 B2 | 1/2010 | Kirchmeier et al. |
| 7,692,936 B2 | 4/2010 | Richter |
| 7,705,676 B2 | 4/2010 | Kirchmeier et al. |
| 7,791,912 B2 | 9/2010 | Walde |
| 7,839,504 B1 | 11/2010 | Newbury |
| 7,902,991 B2 | 3/2011 | Park et al. |
| 7,978,324 B2 | 7/2011 | Pan et al. |
| 8,025,775 B2 | 9/2011 | Tuymer et al. |
| 8,031,337 B2 | 10/2011 | Den Boef |
| RE42,917 E | 11/2011 | Hauer et al. |
| 8,054,453 B2 | 11/2011 | Harrison |
| 8,089,026 B2 | 1/2012 | Sellers |
| 8,129,653 B2 | 3/2012 | Kirchmeier et al. |
| 8,154,897 B2 | 4/2012 | Glueck et al. |
| 9,279,722 B2 * | 3/2016 | Bolles ........................ G01J 3/10 |
| 2002/0008874 A1 | 1/2002 | Lee et al. |
| 2002/0068012 A1 | 6/2002 | Platt, Jr. et al. |
| 2002/0097402 A1 | 7/2002 | Manning |
| 2002/0125223 A1 | 9/2002 | Johnson et al. |
| 2002/0125225 A1 | 9/2002 | Smith et al. |
| 2002/0125226 A1 | 9/2002 | Smith et al. |
| 2002/0195330 A1 | 12/2002 | Agamohamadi et al. |
| 2003/0047546 A1 | 3/2003 | Gross et al. |
| 2003/0059340 A1 | 3/2003 | Chien et al. |
| 2003/0067600 A1 | 4/2003 | Curtiss |
| 2003/0071035 A1 | 4/2003 | Brailove |
| 2003/0080097 A1 | 5/2003 | Boulos et al. |
| 2003/0090673 A1 | 5/2003 | Han et al. |
| 2003/0147770 A1 | 8/2003 | Brown et al. |
| 2003/0150710 A1 | 8/2003 | Evans et al. |
| 2003/0174526 A1 | 9/2003 | Mark |
| 2003/0213782 A1 | 11/2003 | MacKenzie et al. |
| 2003/0213783 A1 | 11/2003 | Kinerson et al. |
| 2003/0213784 A1 | 11/2003 | MacKenzie et al. |
| 2003/0215373 A1 | 11/2003 | Reyzelman et al. |
| 2004/0000538 A1 | 1/2004 | Conway et al. |
| 2004/0026231 A1 | 2/2004 | Pribyl |
| 2004/0032212 A1 | 2/2004 | Yuzurihara et al. |
| 2004/0079735 A1 | 4/2004 | Kinerson et al. |

(56) References Cited

U.S. PATENT DOCUMENTS

| | | |
|---|---|---|
| 2004/0094519 A1 | 5/2004 | Conway et al. |
| 2004/0156043 A1 | 8/2004 | Toker et al. |
| 2004/0179363 A1 | 9/2004 | Bosser et al. |
| 2004/0195217 A1 | 10/2004 | Conway et al. |
| 2004/0195219 A1 | 10/2004 | Conway et al. |
| 2004/0200810 A1 | 10/2004 | Brandt et al. |
| 2004/0256365 A1 | 12/2004 | DePetrillo et al. |
| 2005/0000442 A1 | 1/2005 | Hayashi et al. |
| 2005/0001172 A1 | 1/2005 | Harrison |
| 2005/0001173 A1 | 1/2005 | Harrison |
| 2005/0002037 A1 | 1/2005 | Harrison |
| 2005/0006590 A1 | 1/2005 | Harrison |
| 2005/0040144 A1 | 2/2005 | Sellers |
| 2005/0082263 A1 | 4/2005 | Koike et al. |
| 2005/0088855 A1 | 4/2005 | Kirchmeier et al. |
| 2005/0092718 A1 | 5/2005 | Brandt et al. |
| 2005/0098430 A1 | 5/2005 | Tuymer et al. |
| 2005/0099133 A1 | 5/2005 | Quon et al. |
| 2005/0134186 A1 | 6/2005 | Brouk et al. |
| 2006/0011591 A1 | 1/2006 | Sellers |
| 2006/0016789 A1 | 1/2006 | MacKenzie et al. |
| 2006/0049831 A1 | 3/2006 | Anwar et al. |
| 2006/0192958 A1 | 8/2006 | Harrison |
| 2006/0262304 A1 | 11/2006 | Carron |
| 2007/0046659 A1 | 3/2007 | Iwami et al. |
| 2007/0084834 A1 | 4/2007 | Hanus et al. |
| 2007/0085133 A1 | 4/2007 | Kirchmeier et al. |
| 2007/0103092 A1 | 5/2007 | Millner et al. |
| 2007/0145018 A1 | 6/2007 | Smith et al. |
| 2007/0175871 A1 | 8/2007 | Brezni et al. |
| 2007/0210037 A1 | 9/2007 | Ishida et al. |
| 2007/0235417 A1 | 10/2007 | Kuo |
| 2007/0258274 A1 | 11/2007 | Richter |
| 2007/0284242 A1 | 12/2007 | Moisan et al. |
| 2007/0292321 A1 | 12/2007 | Plischke et al. |
| 2007/0295701 A1 | 12/2007 | Bodroghkozy |
| 2008/0011426 A1 | 1/2008 | Chua |
| 2008/0061793 A1 | 3/2008 | Anwar et al. |
| 2008/0074255 A1 | 3/2008 | Park et al. |
| 2008/0210669 A1 | 9/2008 | Yang et al. |
| 2008/0218264 A1 | 9/2008 | Kirchmeier et al. |
| 2008/0239265 A1 | 10/2008 | Den Boef |
| 2008/0259318 A1 | 10/2008 | Pan et al. |
| 2008/0285613 A1 | 11/2008 | Murray |
| 2009/0015314 A1 | 1/2009 | Kirchmeier et al. |
| 2009/0026180 A1 | 1/2009 | Yang et al. |
| 2009/0026181 A1 | 1/2009 | Kirchmeier et al. |
| 2009/0026964 A1 | 1/2009 | Knaus |
| 2009/0026968 A1 | 1/2009 | Kirchmeier et al. |
| 2009/0027936 A1 | 1/2009 | Glueck et al. |
| 2009/0027937 A1 | 1/2009 | Kirchmeier et al. |
| 2009/0262366 A1 | 10/2009 | Den Boef |
| 2009/0273954 A1 | 11/2009 | Walde |
| 2010/0026186 A1 | 2/2010 | Forrest et al. |
| 2010/0043973 A1 | 2/2010 | Hayami |
| 2010/0097613 A1 | 4/2010 | Saari |
| 2010/0170640 A1 | 7/2010 | Kirchmeier et al. |
| 2010/0171427 A1 | 7/2010 | Kirchmeier et al. |
| 2010/0171428 A1 | 7/2010 | Kirchmeier et al. |
| 2010/0194280 A1 | 8/2010 | Kirchmeier et al. |
| 2010/0264120 A1 | 10/2010 | Reinke et al. |
| 2010/0278999 A1 | 11/2010 | Onodera et al. |
| 2010/0328648 A1 | 12/2010 | Harrison |
| 2011/0056918 A1 | 3/2011 | Brezni et al. |
| 2011/0204258 A1 | 8/2011 | Heller et al. |
| 2011/0241892 A1 | 10/2011 | Park et al. |
| 2011/0259855 A1 | 10/2011 | Yang |
| 2011/0284502 A1 | 11/2011 | Krink et al. |
| 2012/0055906 A1 | 3/2012 | Shipulski et al. |

FOREIGN PATENT DOCUMENTS

| | | |
|---|---|---|
| DE | 1291533 B | 3/1969 |
| DE | 3915421 A1 | 11/1990 |
| DE | 4221063 A1 | 1/1994 |
| EP | 0635705 A2 | 1/1995 |
| EP | 1024539 A2 | 8/2000 |

OTHER PUBLICATIONS

Chinese Office Action for 201310111452.2 with mailing date of Mar. 2, 2016.

Dubuisson et al., "Comparison of Axially and Radially Viewed Inductively Coupled Plasma Atomic Emission Spectrometry in Terms of Signal-to-Background ratio and Matrix Effects Plenary Lecture," Journal of Analytical Atomic Spectrometry (Mar. 1997), 12, 281-286.

Hill et al., "Basic Concepts and Instrumentation for Plasma Spectrometry," Inductively Coupled Plasma Spectrometry and its Applications (2007), 61-97.

Office Action dated Mar. 13, 2015 from U.S. Appl. No. 13/460,308.

GB Search Report dated Aug. 20, 2013.

* cited by examiner

OPTICAL EMISSION SYSTEM INCLUDING DICHROIC BEAM COMBINER

CROSS-REFERENCE TO RELATED APPLICATIONS

The present application is a continuation application under 37 C.F.R. §1.53(b) of U.S. patent application Ser. No. 13/460,308, filed on Apr. 30, 2012, naming Michael Bolles et al. as inventors (published as U.S. Patent App. Pub. No. 2013/0286390 on Oct. 31, 2012). Priority under 35 U.S.C. §120 is claimed from U.S. patent application Ser. No. 13/460,308, and the entire disclosure of U.S. patent application Ser. No. 13/460,308 is specifically incorporated herein by reference.

BACKGROUND

Conventional optical emission spectrometers may include inductively coupled plasma (ICP) light sources for spectrochemical analysis. Generally, selecting light emitted along an axis of an ICP light source (axial viewing) for detection and measurement provides increased signal-to-background ratios, and consequently improved limits of detection, as compared to selecting light emitted along a direction perpendicular to the axis of the ICP light source (radial viewing). This advantage is particularly important for certain elements, such as arsenic (As), selenium (Se), lead (Pb) and others having optical emission lines in the ultraviolet region of the spectrum. However, under certain circumstances, selecting the light emitted perpendicular to the axis of the inductively coupled plasma source is advantageous, in that it enables measurement of a greater range of concentrations and allows optimization of the position of light selection to minimize inter-element interference effects. This may be particularly important for easily-ionized elements, such as potassium (K), sodium (Na), lithium (Li) and others having optical emission lines in the visible region of the spectrum. In addition, axial viewing generally provides high sensitivity and poor linearity, while radial viewing generally provides lower sensitivity and better linearity.

Attempts have been made to enable selection of light emitted along or perpendicular to the axis of an inductively coupled plasma source. For example, light for detection and measurement may be selected as required from either light emitted along the axis or light at right angles to the axis of the light source, but not both at the same time. That is, only one mode of viewing may be selected at any time. Accordingly, when a modern simultaneous spectrometer is used, for example, it is necessary to take separate measurements (e.g., separated in time) in each of the axial and radial viewing modes to obtain best performance for each element of interest. In order to achieve simultaneous axial viewing and radial viewing of the light, one spectrometer must be used for axial viewing and another spectrometer must be used for radial viewing. In other words, conventional systems require either two separate views using one spectrometer (increasing analysis time and sample consumption), or two simultaneous views, using separate spectrometers for each view (a very costly alternative).

SUMMARY

In a representative embodiment, an optical emission spectrometer system includes a light source and a dichroic beam combiner. The light source is configured to emit first light in a first direction and second light in a second direction different from the first direction. The dichroic beam combiner is configured to receive the first light via a first light path and the second light via a second light path, to reflect a portion of the first light into an entrance aperture of a light detection and measurement apparatus, and to transmit a portion of the second light into the entrance aperture, enabling the light detection and measurement apparatus to analyze or measure characteristics of both the first light and the second light. The portion of the first light reflected into the entrance aperture predominately has wavelengths in a first range of wavelengths and the portion of the second light transmitted into the entrance aperture predominately has wavelengths in a second range of wavelengths, different from the first range of wavelengths.

In another representative embodiment, an optical emission spectrometer apparatus includes optical directing means, optical filtering means and optical combining means. The optical directing means are configured to direct first light emitted from a light source in a first direction along a first light path to a single light detection and measurement apparatus, and to direct second light emitted from the light source in a second direction, different from the first direction, along a second light path to the same light detection and measurement apparatus. The optical filtering means are configured to simultaneously filter the first and second light into predominantly different wavelength ranges. The optical combining means are configured to combine the filtered first and second light prior to the single light detection and measurement apparatus.

In another representative embodiment, an optical emission spectrometer system includes a plasma light source configured to emit first light in a first direction and second light in a second direction substantially perpendicular to the first direction; a first plurality of mirrors for directing the first light along a first light path; a second plurality of mirrors for directing the second light along a second light path; and a mode selector including mode sections corresponding to positions of the mode selector. The mode selector is selectively movable, such that the first and second light paths intersect one of the mode sections. The mode sections include a dichroic beam combiner, a mirrored section and a transparent section. The dichroic beam combiner is configured to reflect wavelengths of the first light predominantly in a predetermined first wavelength range into an entrance aperture of a detector, and to transmit wavelengths of the second light predominantly in a predetermined second wavelength range into the entrance aperture, enabling analysis of both the first light and the second light, the second wavelength range being different from the first wavelength range. The mirrored section is configured to reflect all wavelengths of the first light into the entrance aperture of the detector, and to reflect all wavelengths of the second light away from the entrance aperture of the detector, enabling analysis of the first light. The transparent section is configured to transmit all wavelengths of the second light into the entrance aperture of the detector, and to transmit all wavelengths of the first light away from the entrance aperture of the detector, enabling analysis of the second light.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

An optical emission spectrometer system may be used for spectrochemical analysis. According to various embodiments, the optical emission spectrometer system includes an inductively coupled plasma light source, an optical filter, and a spectrometer, or other light detection and measurement apparatus. In an embodiment, light is emitted by the plasma light source in a direction along a longitudinal axis of the plasma light source (axially-emitted light) and in a direction different from the direction along the longitudinal axis of the plasma light source (radially-emitted). For example, the radially-emitted light may be emitted in a direction substantially perpendicular to the longitudinal axis. The optical filter directs portions of both the axially-emitted light and the radially emitted light to the spectrometer based on wavelengths, where each portion includes wavelengths predominately within a range above or below a predetermined wavelength value. The spectrometer is thus able to simultaneously collect the axially-emitted light (axial viewing) and the radially-emitted light (radial viewing). For example, the optical filter may allow only light predominately having wavelengths shorter than the predetermined wavelength value to enter the spectrometer for axial viewing, and may allow only light predominately having wavelengths above the predetermined wavelength value to enter the spectrometer for radial viewing.

Generally, advantages of axial viewing are typically associated with elements having their most sensitive emission lines in the ultraviolet region of the spectrum, whereas advantages of radial viewing are typically associated with elements having their most sensitive emission lines in the visible region of the spectrum. The optical emission spectrometer system, according to representative embodiments, enables simultaneous axial viewing and radial viewing, as mentioned above. Thus, the single spectrometer is able to receive and measure light intensity from two light paths simultaneously.

Figure 1:
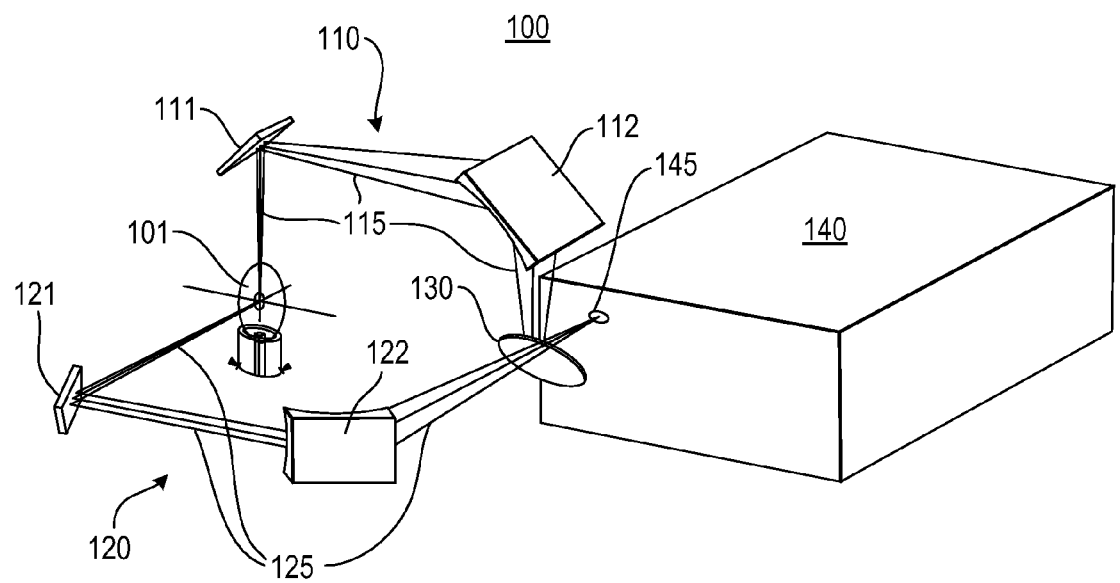
FIG. 1 is an isometric view of an optical emission spectrometer system, according to a representative embodiment.

FIG. 1 is an isometric view of an optical emission spectrometer system, according to a representative embodiment.

Referring to FIG. 1, optical emission spectrometer system 100 includes a light source 101 for emitting light that can be detected and measured with respect to wavelength by a light detection and measurement apparatus 140, e.g., for detecting and measuring light and analyzing wavelength. The light source 101 may be an inductively coupled plasma light source, for example. Also, the light detection and measurement apparatus 140 may be a monochromator or a polychromator, for example, together with at least one associated light detector. The light from the light source 101 enters the light detection and measurement apparatus 140 via slit or entrance aperture 145.

The optical emission spectrometer system 100 further includes first light path 110 and second light path 120. The first light path 110 includes a first set of mirrors, depicted by representative mirrors 111 and 112, configured to direct light emitted by the light source 101 in a first direction (referred to as first light 115) onto an optical filter, such as representative dichroic beam combiner 130. In the depicted example, the first light 115 is emitted axially from the light source 101, i.e., along the longitudinal axis, and is reflected by the mirror 111 onto the mirror 112, and by the mirror 112 onto the dichroic beam combiner 130. The second light path 120 includes a second set of mirrors, depicted by representative mirrors 121 and 122, configured to direct light emitted by the plasma light source 101 in a second direction (referred to as second light 125), substantially perpendicular to the first direction, onto the dichroic beam combiner 130. In the depicted embodiment, the second light 125 is emitted radially from the light source 101, and is reflected by the mirror 121 onto the mirror 122, and by the mirror 122 onto the dichroic beam combiner 130.

Of course, the first direction of the first light 115 emitted from the light source 101 and the second direction of the second light 125 emitted from the light source 101 may vary without departing from the scope of the present teachings. For example, the first direction of the first light 115 may be at an angle departing from the longitudinal axis of the light source 101, rather than along the longitudinal axis. Likewise, the second direction of the second light 125 may be any direction different from the first direction, and therefore does not need to be substantially perpendicular to the longitudinal axis of the light source 101 and/or substantially perpendicular to the first direction of the first light 115.

In various embodiments, at least one of the mirrors 111, 112 in the first light path 110 and at least one of the mirrors 121, 122 in the second light path 120 may be adjustable using an electric motor, such as a step motor, for example. Adjustment of the mirrors 111, 112 and 121, 122 enables the first and second light 115 and 125 to be properly focused onto the dichroic beam combiner 130 and/or the entrance aperture 145, respectively. The motor may be manually or automatically operable, e.g., using a controller or other processing device (not shown). For example, the processing device may be implemented by a computer processor, application specific integrated circuits (ASICs), field-programmable gate arrays (FPGAs), or combinations thereof, using software, firmware, hard-wired logic circuits, or combinations thereof. When using a processor, a memory may be included, such as a non-transitory computer readable medium, for storing executable software/firmware and/or executable code that allows it to perform the various functions.

The dichroic beam combiner 130 receives the first light 115 via the first light path 110 and the second light 125 via the second light path 120. In the depicted embodiment, the dichroic beam combiner 130 is configured to reflect only a portion the first light 115 into the entrance aperture 145 of the light detection and measurement apparatus 140, and to transmit a only portion of the second light 125 into the entrance aperture 145, enabling the light detection and measurement apparatus 140 to analyze and measure simultaneously characteristics of both the first light 115 and the second light 125 using the respective portions of the first light 115 and the second light 125. Of course, in alternative embodiments, the dichroic beam combiner 130 may be configured to transmit the portion the first light 115 and to reflect the portion of the second light 125 into the entrance aperture 145 of the light detection and measurement apparatus 140, without departing from the scope of the present teachings.

More particularly, the dichroic beam combiner 130 reflects or transmits the portions of the first and second light 115 and 125 depending on wavelength. For example, the dichroic beam combiner 130 has an associated predetermined wavelength value, which is essentially a demarcation between wavelengths that are predominately reflected and wavelengths that are predominately transmitted by the dichroic beam combiner 130. For example, the dichroic beam combiner 130 may reflect portions of the first and second light 115 and 125 predominantly having wavelengths below the predetermined wavelength value, and transmit portions of the first and second light 115 and 125 predominantly having wavelengths above the predetermined wavelength value. In this context, predominantly means greater than 50 percent of the total amount of the respective portion of light. In other words, in this example, more than 50 percent of the portion of the first light 115 reflected by the dichroic beam combiner 130 has wavelengths below the predetermined wavelength value. The dichroic beam combiner 130 thus effectively filters the first and second light 115 and 125 into predominantly different wavelength ranges, and combines the filtered first and second light 115 and 125 for input into the entrance aperture 145 of the light detection and measurement apparatus 140.

The predetermined wavelength value may be about 500 nanometers (nm), for example, although other predetermined wavelength values may be implemented, to provide unique benefits for any particular situation or to meet application specific design requirements, without departing from the scope of the present teachings. The wavelengths below the predetermined wavelength value (e.g., less than 500 nm) may be referred to as a first range of wavelengths, and the wavelengths above the predetermined wavelength value (e.g., greater than 500 nm) may be referred to as a second range of wavelengths, for convenience of explanation. Notably, the optical filter may be implemented using filtering means augmenting the dichroic beam combiner 130, as well. A further variation of this embodiment includes optical filters placed separately in the first light path 110 and second light path 120, in order to select substantially different wavelength ranges from the first light 115 and the second light 125, and a beam combiner to recombine the filtered first and second light 115 and 125.

Figure 2:
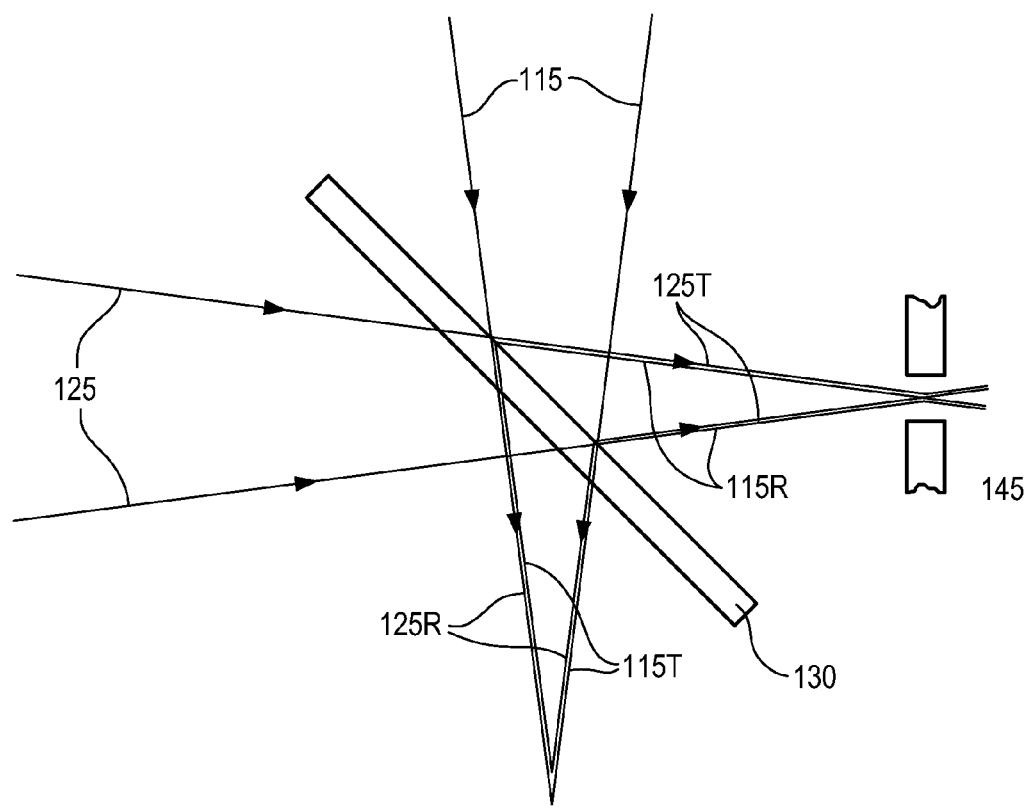
FIG. 2 is a cross-sectional view of a dichroic beam combiner of the optical emission spectrometer system of FIG. 1, according to a representative embodiment.

FIG. 2 is a cross-sectional view of the dichroic beam combiner 130 of the optical emission spectrometer system 100 shown in FIG. 1, according to a representative embodiment. Referring to FIG. 2, the dichroic beam combiner 130 is tilted so that the portions of the first and second light 115 and 125 that it reflects are either directed into or away from the entrance aperture 145 of the light detection and measurement apparatus 140. More particularly, when the dichroic beam combiner 130 receives the first light 115, it reflects a reflected portion 115R into the entrance aperture 145 and transmits a transmitted portion 115T away from the entrance aperture 145 (meaning the transmitted portion 115T does not enter the entrance aperture 145). When the dichroic beam combiner 130 receives the second light 125, at the same time as receiving the first light 115, it reflects a reflected portion 125R away from the entrance aperture 145 and transmits a transmitted portion 125T into the entrance aperture 145.

As mentioned above, since the dichroic beam combiner 130 reflects portions of the first and second light 115 and 125 predominately having wavelengths below the predetermined wavelength value, the reflected portion 115R of the first light 115 and the reflected portion 125R of the second light 125 have wavelengths predominately in the first range of wavelengths. Therefore, in the depicted example, the light detection and measurement apparatus 140 receives the portion of the first light 115 having wavelengths predominately in the first range of wavelengths. Likewise, since the dichroic beam combiner 130 transmits portions of the first and second light 115 and 125 predominately having wavelengths above the predetermined wavelength value, the transmitted portion 115T of the first light 115 and the transmitted portion 125T of the second light 125 have wavelengths predominately in the second range of wavelengths. Therefore, in the depicted example, the light detection and measurement apparatus 140 receives the portion of the second light 125 having wavelengths predominately in the second range of wavelengths.

In other words, the light detection and measurement apparatus 140 generally receives shorter wavelengths (e.g., in the ultraviolet region of the spectrum) of the first light 115 and longer wavelengths (e.g., in the visible region of the spectrum) of the second light 125. Of course, in alternative embodiments, the dichroic beam combiner 130 may be configured to transmit portions of the first and second light 115 and 125 predominately having wavelengths below the predetermined wavelength value, and to reflect portions of the first and second light 115 and 125 predominately having wavelengths above the predetermined wavelength value, without departing from the scope of the present teachings.

Figure 8:
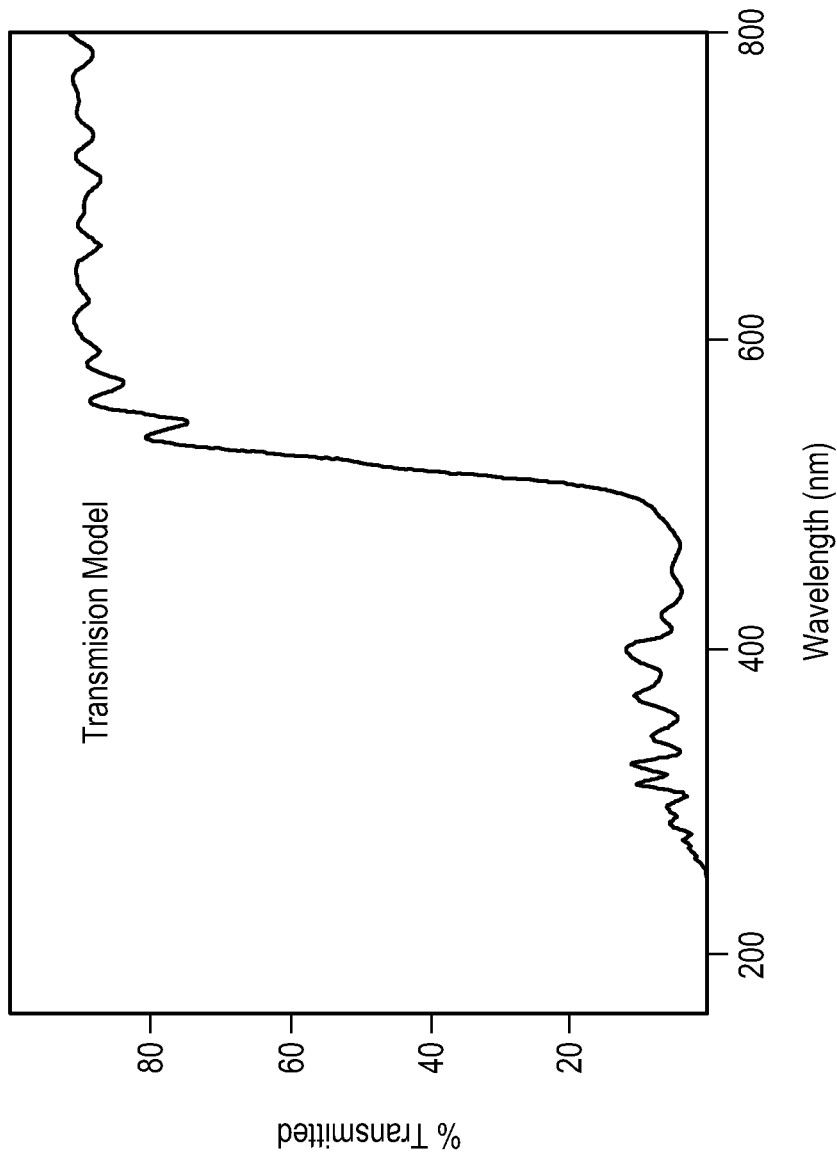
FIG. 8 illustrates a trace indicating a portion of light transmitted by a dichroic beam combiner, depending on wavelength, according to a representative embodiment.
Figure 9:
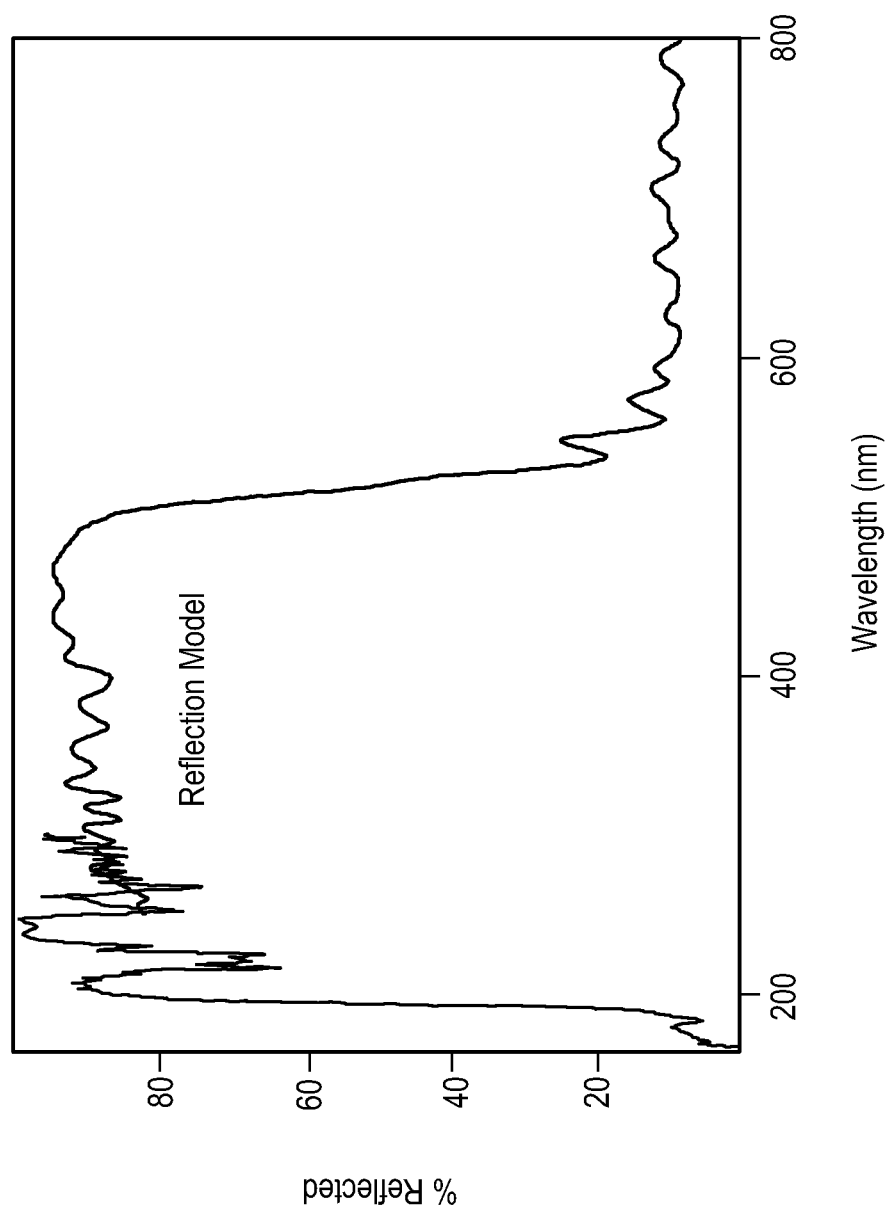
FIG. 9 illustrates a trace indicating a portion of light reflected by a dichroic beam combiner, depending on wavelength, according to a representative embodiment.

FIG. 8 shows trace 800 indicating portions of light (such as the first and second light 115 and 125) transmitted by the dichroic beam combiner 130 (transmission model), and FIG. 9 shows trace 900 indicating portions of light reflected by the dichroic beam combiner 130 (reflection model), depending on wavelength. In the depicted examples, the predetermined wavelength value at which transmitted and reflected light is separated is assumed to be about 500 nm.

Referring to FIG. 8, the portion of light transmitted by the dichroic beam combiner 130 predominantly has wavelengths above about 500 nm, as discussed above. That is, the dichroic beam combiner 130 generally transmits light having wavelengths longer than about 500 nm and does not transmit (or reflects) light having wavelengths shorter than about 500 nm. In the depicted example, the dichroic beam combiner 130 transmits between about 75% to about 90% of the light having wavelengths longer than about 500 nm, but transmits only about 0% to about 10% of the light having wavelengths shorter than about 500 nm.

Referring to FIG. 9, the portion of light reflected by the dichroic beam combiner 130 predominantly has wavelengths below about 500 nm, as discussed above. That is, the dichroic beam combiner 130 generally reflects light having wavelengths shorter than about 500 nm and does not reflect (or transmits) light having wavelengths longer than about 500 nm. In the depicted example, the dichroic beam combiner 130 reflects between about 70% to about 95% of the light having wavelengths shorter than about 500 nm (and above about 200 nm), but reflects only about 10% to about 15% of the light having wavelengths longer than about 500 nm.

In addition to reflecting a portion of light and transmitting a portion of light based on wavelength, described above, a user of an optical emission spectrometer system may want to reflect or transmit light of all wavelengths under various circumstances. To do so would generally require replacement of the dichroic beam combiner with a reflecting surface or a transmitting surface, respectively, which would be time consuming and otherwise inefficient.

Figure 3:
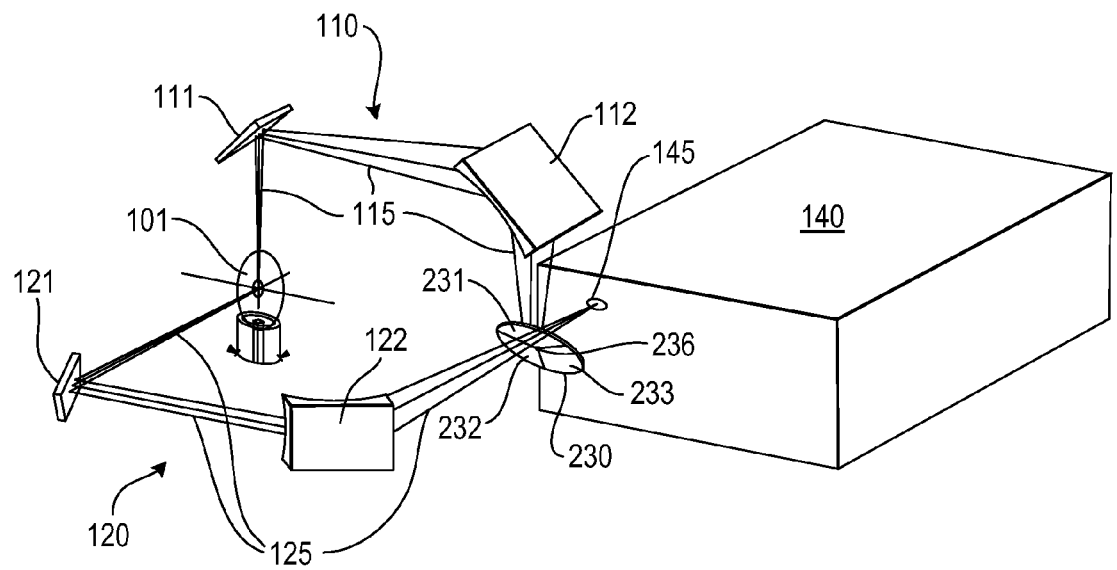
FIG. 3 is an isometric view of an optical emission spectrometer system, according to a representative embodiment.
Figure 4:
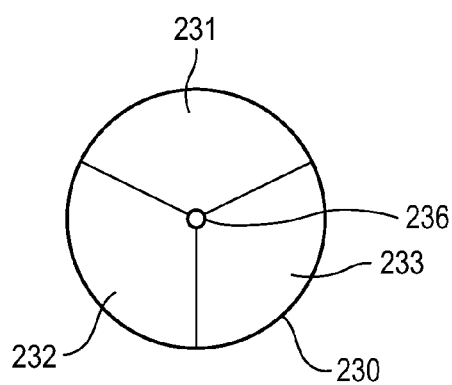
FIG. 4 is a top plan view of a movable member, including a dichroic beam combiner, of the optical emission spectrometer system of FIG. 3, according to a representative embodiment.

FIG. 3 is an isometric view of an optical emission spectrometer system, according to a representative embodiment, which includes a movable member having different sections to control the directivity of light, e.g., emitted by an inductively coupled plasma light source. FIG. 4 is a top plan view of the movable member included in the optical emission spectrometer system of FIG. 3, according to a representative embodiment.

Referring to FIGS. 3 and 4, optical emission spectrometer system 200 is substantially the same as the optical emission spectrometer system 100 of FIG. 1, with the addition of movable member 230. That is, the optical emission spectrometer system 200 includes light source 101 for emitting light that can be detected and measured with respect to wavelength by light detection and measurement apparatus 140. The optical emission spectrometer system 200 further includes first light path 110 and second light path 120. The first light path 110 includes representative mirrors 111 and 112, configured to direct light emitted by the light source 101 in the first direction (first light 115) onto the movable member 230, and the second light path 120 includes representative mirrors 121 and 122, configured to direct light emitted by the light source 101 in the second direction (second light 125), substantially perpendicular to the first direction, onto the movable member 230.

In the depicted embodiment, the movable member 230 includes three mode sections respectively corresponding to first, second and third positions of the movable member 230. The three mode sections include dichroic beam combiner 231 (or other optical filter), mirrored section 232 and transparent section 233. The movable member 230 is selectively movable, such that operation of the movable member 230 places one of the dichroic beam combiner 231, the mirrored section 232 and the transparent section 233 into the first and second light paths 110 and 120 for receiving the first and second light 115 and 125, respectively.

In the depicted embodiment, the movable member 230 is a mode wheel rotatable around axis 236, using a hub and shaft arrangement 237, for example. The mode wheel is substantially circular in shape, and the dichroic beam combiner 231, the mirrored section 232 and the transparent section 233 respectively occupy equal sized sectors (pie-shaped regions) of the mode wheel. The movable member 230 is thus rotatable among a first position for selecting the dichroic beam combiner 231, a second position for selecting the mirrored section 232 and a third position for selecting the transparent section 233.

Rotation of the movable member 230 may be enabled by controllable rotating means (not shown), such as a manual selector and/or an electric (step) motor, for example. The motor may be manually or automatically operable, e.g., using the controller or other processing device (not shown), discussed above. For example, the processing device may be implemented by a computer processor, ASICs, FPGAs, or combinations thereof, using software, firmware, hard-wired logic circuits, or combinations thereof. When using a processor, a memory may be included, such as a non-transitory computer readable medium, for storing executable software/firmware and/or executable code that allows it to perform the various functions.

Of course, the movable member 230 may have different configurations without departing from the scope of the present teachings. For example, the movable member 230 may include a rotatable mode wheel having any of a variety of shapes other than a circle and/or sectors (or sections) having corresponding sizes/shapes different from one another. In addition, the movable member 230 may not be rotatable, but rather may incorporate other means of movement to enable selection of the dichroic beam combiner 231, the mirrored section 232 or the transparent section 233. For example, the movable member 230 may be slideable in various directions among the first, second and third positions in order to place the corresponding one of the dichroic beam combiner 231, the mirrored section 232 and the transparent section 233 into the first and second light paths 110 and 120.

Figure 5:
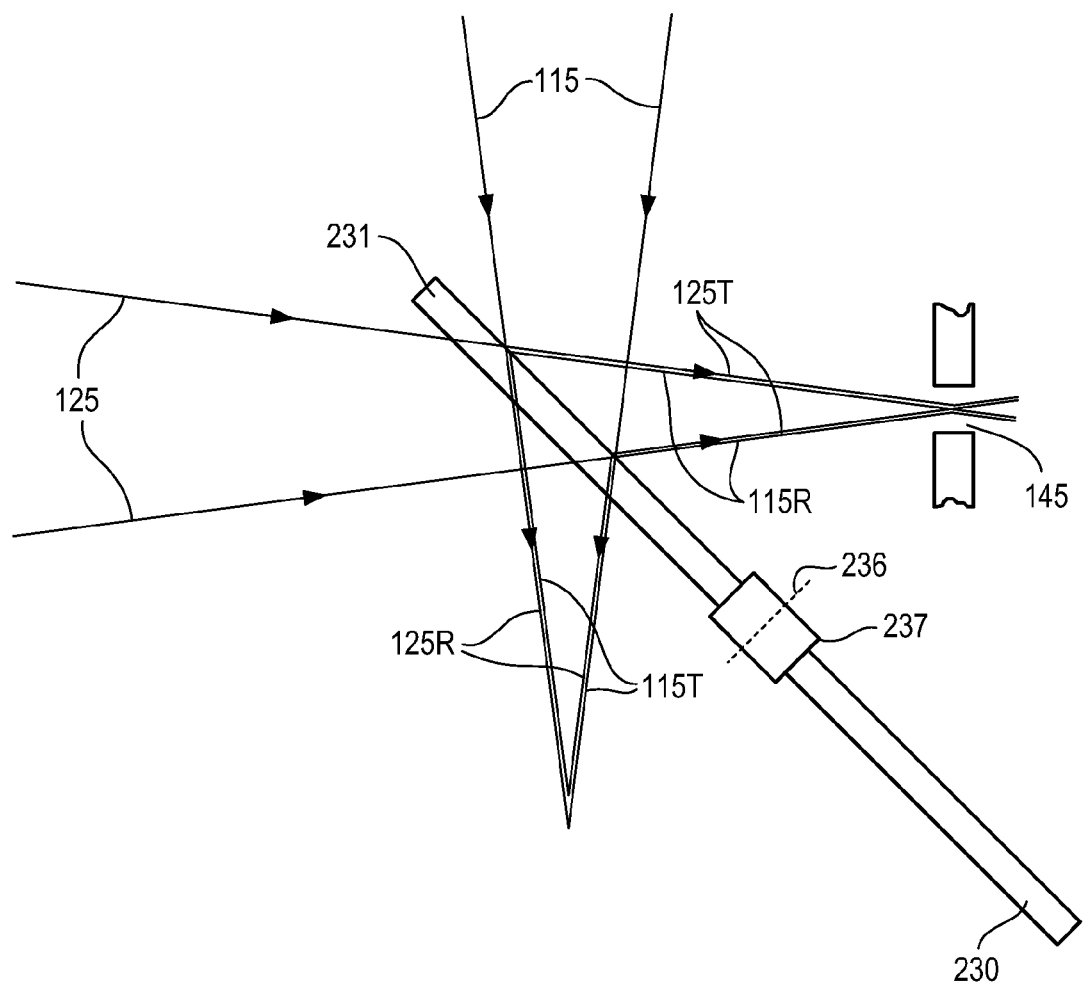
FIG. 5 is a cross-sectional view of the movable member of FIGS. 3 and 4 in a first position, according to a representative embodiment.

FIG. 5 is a cross-sectional view of the movable member 230 of the optical emission spectrometer system 200 shown in FIGS. 3 and 4 in a first position, according to a representative embodiment. Referring to FIG. 5, the first position places the dichroic beam combiner 231 within the first and second light paths 110 and 120. The movable member 230 is tilted so that the portions of the first and second light 115 and 125 reflected by the dichroic beam combiner 231 are either directed into or away from the entrance aperture 145 of the light detection and measurement apparatus 140, as discussed above. When the dichroic beam combiner 231 receives the first light 115, it reflects a reflected portion 115R into the entrance aperture 145 and transmits a transmitted portion 115T away from the entrance aperture 145 (meaning the transmitted portion 115T does not enter the entrance aperture 145). When the dichroic beam combiner 231 receives the second light 125, at the same time as receiving the first light 115, it reflects a reflected portion 125R away from the entrance aperture 145 and transmits a transmitted portion 125T into the entrance aperture 145. Each of the reflected portions 115R and 125R and the transmitted portions 115T and 125T is determined by the wavelengths of the first light 115 and the second light 125, respectively, in comparison to a predetermined wavelength value, as discussed above.

Figure 6:
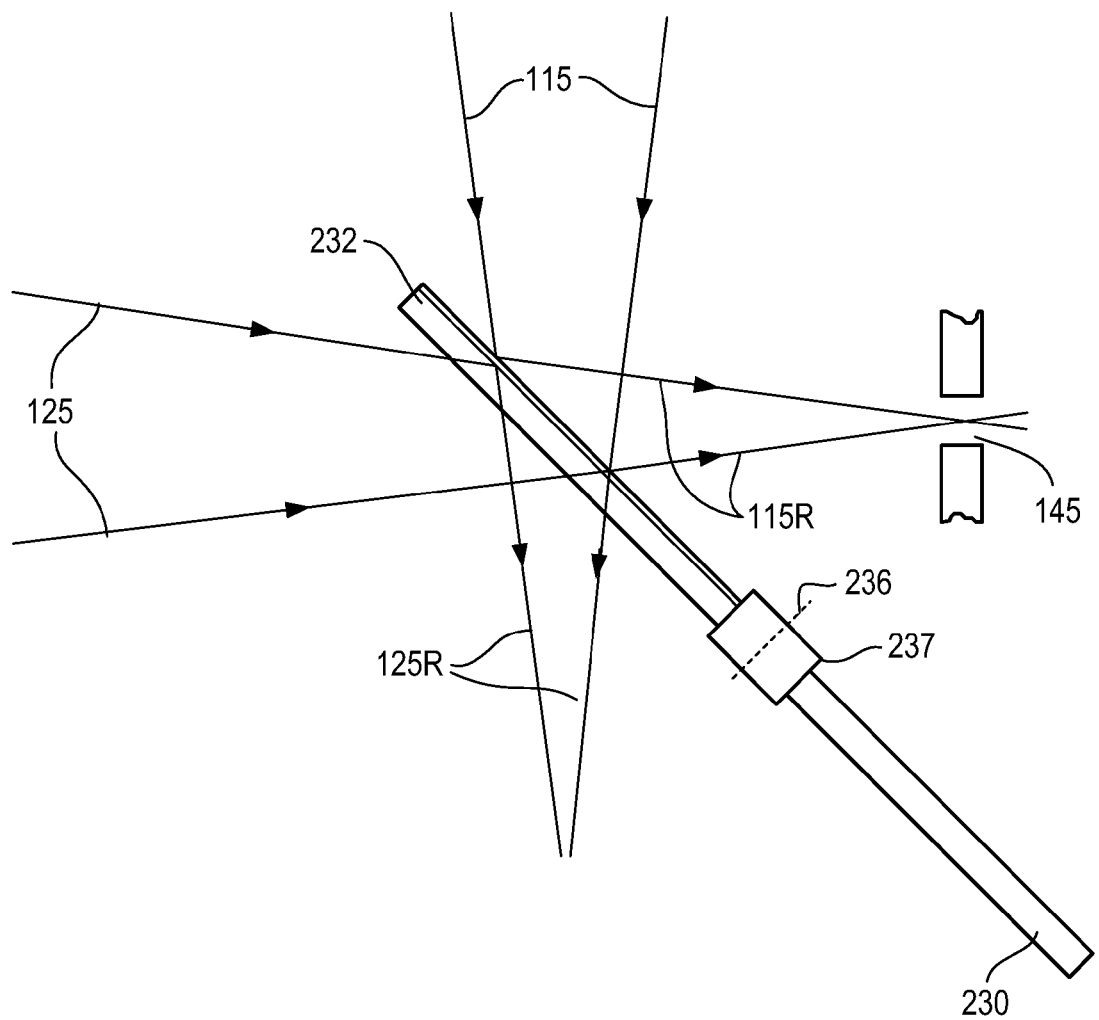
FIG. 6 is a cross-sectional view of the movable member of FIGS. 3 and 4 in a second position, according to a representative embodiment.

FIG. 6 is a cross-sectional view of the movable member 230 of the optical emission spectrometer system 200 shown in FIGS. 3 and 4 in a second position, according to a representative embodiment. Referring to FIG. 6, the second position places the mirrored section 232 within the first and second light paths 110 and 120. The movable member 230 is tilted so that the portions of the first light 115 reflected by the mirrored section 232 are directed into the entrance aperture 145 of the light detection and measurement apparatus 140. That is, when the mirrored section 232 receives the first light 115, it reflects a reflected portion 115R into the entrance aperture 145, where the reflected portion 115R includes substantially all wavelengths of the first light 115. When the mirrored section 232 receives the second light 125, at the same time as receiving the first light 115, it reflects a reflected portion 125R away from the entrance aperture 145, where the reflected portion 125R includes substantially all of the wavelengths of the second light 125. In other words, when the movable member 230 is in the second position, the light detection and measurement apparatus 140 only receives the first light 115 via the entrance aperture 145, including substantially all of the wavelengths.

Figure 7:
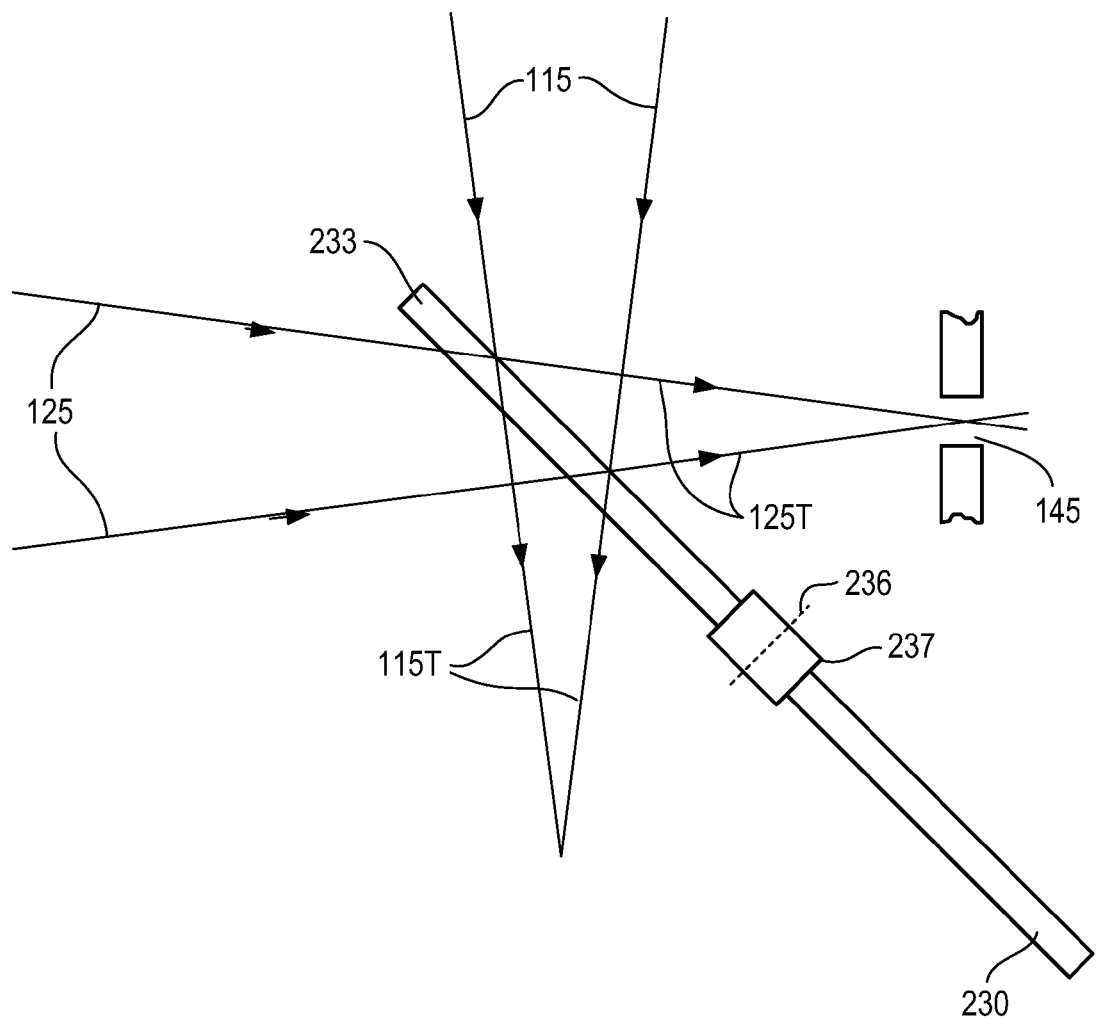
FIG. 7 is a cross-sectional view of the movable member of FIGS. 3 and 4 in a third position, according to a representative embodiment.

FIG. 7 is a cross-sectional view of the movable member 230 of the optical emission spectrometer system 200 shown in FIGS. 3 and 4 in a third position, according to a representative embodiment. Referring to FIG. 6, the third position places the transparent section 233 within the first and second light paths 110 and 120. When the transparent section 233 receives the first light 115, it transmits a transmitted portion 115T away from the entrance aperture 145, where the transmitted portion 115T includes substantially all of the wavelengths of the first light 115. When the transparent section 233 receives the second light 125, at the same time as receiving the first light 115, it transmits a transmitted portion 125T into the entrance aperture 145, where the transmitted portion 125T includes substantially all of the wavelengths of the second light 125. In other words, when the movable member 230 is in the third position, the light detection and measurement apparatus 140 only receives the second light 125 via the entrance aperture 145, including substantially all of the wavelengths.

Generally, the mirrored section 232 in the movable member 230 enables measurement of substantially the entire wavelength range of the axially emitted light (first light 115), in the depicted illustrative configuration, which allows for more sensitive detection of light in the wavelengths that would otherwise have been transmitted away from the aperture 145 by the dichroic beam combiner (e.g., beam combiner 231). Better detection limits may be achieved because the axial light path (first light path 110) is approximately ten to forty times more intense than the radial light path (second light path 120), but axial only measurements may suffer from Easily Ionized Element Interferences when easily ionized elements are present. The transparent section 233 in the movable member 230 enables measurement of substantially the entire wavelength range of the radially emitted light (second light 125), in the depicted illustrative configuration. The availability of the less intense radial light increases the dynamic range of measurement (when used in conjunction with the axial light measurements) by allowing measurement of intense sample concentrations that would otherwise over-range an axial light measurement. This may result in lower detection limits due to the reduction of available light compared to the axial light path.

According to various embodiments, measurements of the intensity of axially-emitted light (e.g., originating along the direction of the axis of the light source) and measurements of the intensity of radially-emitted light (e.g., originating along the direction substantially perpendicular to the axis of the light source) are made simultaneously by the same spectrometer. In contrast, conventional systems measure axially-emitted light and radially-emitted light sequentially using one spectrometer, or simultaneously using two spectrometers. Therefore, in carrying out an analysis of a sample for which it is required to make measurements of both axially-emitted light and radially-emitted light using a single spectrometer capable of simultaneous measurements, according to various embodiments, only one set of measurements needs to be made. Therefore, the measurements may be completed in about half the time, as compared to conventional systems.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. An optical emission spectrometer system, comprising:
a light source configured to emit first light in a first direction and second light in a second direction different from the first direction;
a dichroic beam combiner configured to receive the first light via a first light path and the second light via a second light path, to reflect a portion of the first light into an entrance aperture of a light detection and measurement apparatus, and to transmit a portion of the second light into the entrance aperture, wherein the portion of the first light reflected into the entrance aperture predominately has wavelengths in a first range of wavelengths and the portion of the second light transmitted into the entrance aperture predominately has wavelengths in a second range of wavelengths different from the first range of wavelengths; and
a movable member including the dichroic beam combiner, a mirrored section and a transparent section, the movable member being operable to place one of the dichroic beam combiner, the mirrored section and the transparent section into the first and second light paths for receiving the first and second light.

2. The system of claim 1, wherein the mirrored section of the movable member is configured to reflect substantially all wavelengths of the first light into the entrance aperture of the detector, and to reflect substantially all wavelengths of the second light away from the entrance aperture of the detector.

3. The system of claim 1, wherein the transparent section of the movable member is configured to transmit substantially all wavelengths of the first light away from the entrance aperture of the detector, and to transmit substantially all wavelengths of the second light into the entrance aperture of the detector.

4. The system of claim 1, wherein the first direction is along art axis of the light source and the second direction is substantially perpendicular to the axis of the light source.

5. The system of claim 1, wherein the first range of wavelengths is below a predetermined wavelength value, and the second range of wavelengths is above the predetermined wavelength value.

6. The system of claim 5, wherein the predetermined wavelength value is about 500 nm.

7. The system of claim 1, wherein the first range of wavelengths is above a predetermined wavelength value, and the second range of wavelengths is below the predetermined wavelength value.

8. The system of claim 7, wherein the predetermined wavelength value is about 500 nm.

9. The system of claim 1, wherein the first light path comprises a first set of mirrors configured to direct the first light to the dichroic beam combiner; and
wherein the second light path comprises a second set of mirrors configured to direct the second light to the dichroic beam combiner.

10. The system of claim 1, wherein the light detection and measurement apparatus comprises one of a monochromator or a polychromator, and at least one associated light detector.

11. An optical emission spectrometer system, comprising:
a light source configured to emit first light in a first direction and second light in a second direction different from the first direction; and
a dichroic beam combiner configured to receive the first light via a first light path and the second light via a second light path, to reflect a portion of the first light into an entrance aperture of a light detection and measurement apparatus, and to transmit a portion of the second light into the entrance aperture,
wherein the portion of the first light reflected into the entrance aperture predominately has wavelengths in a first range of wavelengths and the portion of the second light transmitted into the entrance aperture predominately has wavelengths in a second range of wavelengths different from the first range of wavelengths, and
wherein the light source comprises an inductively coupled plasma light source.

12. The system of claim 11, wherein the first direction is along an axis of the light source and the second direction is substantially perpendicular to the axis of the light source.

13. The system of claim 11, wherein the first light path comprises a first set of mirrors configured to direct the first light to the dichroic beam combiner; and
wherein the second light path comprises a second set of mirrors configured to direct the second light to the dichroic beam combiner.

14. An optical emission spectrometer apparatus, comprising:
optical directing means configured to direct first light emitted from a light source in a first direction along a first light path to a single light detection and measurement apparatus, and to direct second light emitted from the light source in a second direction, different from the first direction, along a second light path to the same light detection and measurement apparatus;
optical filtering means configured to simultaneously filter the first and second light into predominantly different wavelength ranges;
optical combining means to combine the filtered first and second light prior to the single lioht detection and measuremc apparatus; and
a movable member selectively movable among first, second and third positions corresponding to the optical filtering means, a mirrored section and a transparent section, respectively, wherein operation of the movable member places one of the optical filtering means, the mirror section and the transparent section into the first and second light paths for receiving the first and second light.

15. The apparatus of claim 14, wherein the mirror section is configured to reflect substantially all wavelengths of only one of the first and second light into the entrance aperture when the movable member is in the second position, and
wherein the transparent section is configured to transmit substantially all wavelengths of only one of the first and second light into the entrance aperture when the movable member is in the third position.

16. The system of claim 14, wherein the light detection and measurement apparatus comprises one of a monochromator or a polychromator, and at least one associated light detector.

17. The apparatus according to claim 14, wherein at least one of the optical filtering means and the optical combining means comprises a dichroic beam combiner configured to reflect a portion of the first light having wavelengths below a predetermined value and to transmit a portion of the second light having wavelengths above the nominal value into the entrance aperture.

18. The apparatus according to claim 14, wherein at least one of the optical filtering means and the optical combining means comprises a dichroic beam combiner configured to transmit a portion of the first light having wavelengths below a nominal value and to reflect a portion of the second light having wavelengths above the nominal value into the entrance aperture.

19. An optical emission spectrometer system, comprising:
a plasma light source configured to emit first light in a first direction and second light in a second direction substantially perpendicular to the first direction;
a first plurality of mirrors for directing the first light along a first light path;
a second plurality of mirrors for directing the second light along a second light path; and
a mode selector comprising a plurality of mode sections corresponding to a plurality of positions of the mode selector, the mode selector being selectively movable such that the first and second light paths intersect one of the plurality of mode sections, the plurality of mode sections comprising:
a dichroic beam combiner configured to reflect wavelengths of the first light predominantly in a predetermined first wavelength range into an entrance aperture of a detector, and to transmit wavelengths of the second light predominantly in a predetermined second wavelength range into the entrance aperture, enabling analysis of both the first light and the second light, the second wavelength range being different from the first wavelength range;
a mirrored section configured to reflect all wavelengths of the first light into the entrance aperture of the detector, and to reflect all wavelengths of the second light away from the entrance aperture of the detector, enabling analysis of the first light; and
a transparent section configured to transmit all wavelengths of the second light into the entrance aperture of the detector, and to transmit all wavelengths of the first light away from the entrance aperture of the detector, enabling analysis of the second light.

20. The system of claim 19, wherein the first wavelength range comprises wavelengths below a predetermined, wavelength value and the second wavelength range comprises wavelengths above the predetermined wavelength value.

* * * * *

UNITED STATES PATENT AND TRADEMARK OFFICE
CERTIFICATE OF CORRECTION

| | |
|---|---|
| PATENT NO. | : 9,752,933 B2 |
| APPLICATION NO. | : 14/614381 |
| DATED | : September 5, 2017 |
| INVENTOR(S) | : Michael Bolles et al. |

It is certified that error appears in the above-identified patent and that said Letters Patent is hereby corrected as shown below:

On the Title Page

In item (57), in Column 2, in "Abstract", Line 6, after "portion" insert -- of --.

In the Drawings

On sheet 6 of 7, in Figure 8, Line 1, delete "Transmision" and insert -- Transmission --, therefor.

In the Specification

In Column 5, Line 19, after "portion" insert -- of --.

In Column 5, Line 28, after "portion" insert -- of --.

In the Claims

In Column 10, Line 54, in Claim 4, delete "art" and insert -- an --, therefor.

In Column 11, Line 51, in Claim 14, delete "lioht" and insert -- light --, therefor.

In Column 11, Line 52, in Claim 14, delete "measuremc" and insert -- measurement --, therefor.

In Column 12, Line 59, in Claim 20, delete "predetermined," and insert -- predetermined --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*